United States Patent
Yu et al.

(10) Patent No.: US 7,326,743 B2
(45) Date of Patent: Feb. 5, 2008

(54) BIODEGRADABLE POLYMER

(75) Inventors: Long Yu, Clayton (AU); Stephen Coombs, Brisbane (AU); Gregor Bruce Yeo Christie, Middle Park (AU)

(73) Assignee: Plantic Technologies Ltd., Victoria (AU)

( * ) Notice: Subject to any disclaimer, the term of this patent is extended or adjusted under 35 U.S.C. 154(b) by 0 days.

(21) Appl. No.: 10/805,224

(22) Filed: Mar. 22, 2004

(65) Prior Publication Data

US 2004/0242732 A1 Dec. 2, 2004

Related U.S. Application Data

(63) Continuation of application No. 09/857,611, filed on Jun. 8, 2001, now abandoned.

(51) Int. Cl.
*C08L 3/00* (2006.01)
*C08L 3/04* (2006.01)
*C08L 5/00* (2006.01)

(52) U.S. Cl. .............. 524/47; 524/50; 524/52; 524/174; 524/310; 524/313

(58) Field of Classification Search .......... 524/47, 524/50, 52, 174, 310, 313
See application file for complete search history.

(56) References Cited

U.S. PATENT DOCUMENTS

| | | | |
|---|---|---|---|
| 3,949,145 A | | 4/1976 | Otey et al. |
| 5,314,754 A | | 5/1994 | Knight |
| 5,316,578 A | | 5/1994 | Buehler et al. |
| 5,322,866 A | * | 6/1994 | Mayer et al. ............ 524/47 |
| 5,362,777 A | * | 11/1994 | Tomka ............... 524/47 |
| 5,374,304 A | | 12/1994 | Frische et al. |
| 5,393,804 A | | 2/1995 | George et al. |
| 5,444,107 A | | 8/1995 | Ajioka et al. |
| 5,449,708 A | * | 9/1995 | Schiltz .............. 524/47 |
| 5,569,692 A | | 10/1996 | Bastioli et al. |
| 5,691,403 A | | 11/1997 | Shitaohzono et al. |
| 6,284,838 B1 | * | 9/2001 | Silbiger ............. 525/54.4 |
| 6,656,984 B1 | * | 12/2003 | Haasmaa et al. ........ 524/51 |
| 6,780,903 B2 | * | 8/2004 | Peltonen et al. ........ 524/47 |

FOREIGN PATENT DOCUMENTS

| | | |
|---|---|---|
| JP | 8-245836 | 9/1996 |
| JP | 8-325447 | 12/1996 |
| JP | 10-087846 | 4/1998 |
| JP | 10-173341 | 6/1998 |
| WO | WO 92/16583 | 10/1992 |
| WO | WO-98/31523 | 7/1998 |

OTHER PUBLICATIONS

Hawley's Condensed Chemical Dictionary, Thirteenth Edition Revised by Richard J. Lewis, Sr., John Wiley & Sons, Inc., New York, 1997, pp. 487 and 1046.*
Equistar, SARA Title III annual Notification ; Dec. 6, 2002; Material Safety Data Sheet Ultrathene UE 65467; Section 9; Physical and Chemical Properties, Water Solubility, (p. 4 of 7).
Eval Resin Material Safety Data Sheet; Nov. 11, 2000; Section VI; Physical Data, Solubility in Water.

* cited by examiner

*Primary Examiner*—Nathan M. Nutter
(74) *Attorney, Agent, or Firm*—Connolly Bove Lodge & Hutz LLP

(57) ABSTRACT

A biodegradable polymer is disclosed having the composition g) from 8 to 80% by weight of a starch modified to include an hydroxyalkyl $C_{2-6}$ group or modified by reaction with an anhydride of a dicarboxylic acid, preferably hydroxypropylated high amylose starch, a) from 0 to 87.9% of starch, b) from 4 to 11% by weight of a water soluble polymer selected from polyvinylacetate, polyvinyl alcohol and copolymers of ethylene and vinylalcohol which have a melting point compatible with the molten stat of the starch components, c) from 0 to 20% by weight of a polyol plasticiser, preferably glycerol, d) from 0.1 to 1.5% by weight of a $C_{12-22}$ fatty acid or salt, preferably stearic acid and, e) 0 to 12% added water. The polymers are suitable as biodegradable rigid sheet or flexible film materials for use in packaging foodstuffs.

8 Claims, No Drawings

BIODEGRADABLE POLYMER

REFERENCE TO RELATED APPLICATIONS

This application is a continuation of U.S. application Ser. No. 09/857,611, filed Jun. 8, 2001, which is currently now abandoned.

This invention relates to improvements in biodegradable polymeric products particularly starch based polymers.

BACKGROUND TO THE INVENTION

There is an increasing demand for many plastic products used in packaging to be biodegradable. Trays in biscuit and chocolate packages are one example. Starch films have been proposed as biodegradable alternatives for some time. U.S. Pat. No. 3,949,145 proposed a starch/polyvinyl alcohol/glycerol composition for use as a biodegradable agricultural mulch sheet.

Difficulties have been encountered in producing starch based polymers particularly by hot melt extrusion. The molecular structure of the starch is adversely affected by the shear stresses and temperature conditions needed to plasticise the starch and pass it through the extrusion die. For most products foaming has to be avoided and this generally requires attention because of the water content of the starch. Foaming has been avoided by degassing the melt prior to exiting the die as suggested in U.S. Pat. Nos. 5,314,754 and 5,316,578. The latter patent also avoids adding water to the starch. As explained in U.S. Pat. No. 5,569,692 by not drying starch and avoiding the addition of water the starch can be processed at temperatures between 120° C. and 170° C. because the water bound to the starch does not generate a vapour pressure such as to require high pressures. Another approach to improving the melt processability of starch is to provide an additive as in U.S. Pat. No. 5,362,777 which reduces the melting point of the starch. The additive is selected from dimethyl sulfoxide, a selection of polyols and amino or amide compounds.

In order to produce starch polymers for particular applications they have been blended with a range of other polymers. Biodegradable blown films are disclosed in U.S. Pat. No. 5,322,866 which blends raw starch, polyvinyl alcohol and talc with glycerol and water. U.S. Pat. No. 5,449,708 discloses compositions of starch ethylene acrylic acid and a salt of stearic acid plus a glycerol based lubricant. Flexible and clear transparent sheets are disclosed in U.S. Pat. No. 5,374,304. These are composed of a high amylose starch and a glycerol plasticizer. The use of starch in conjunction with high amylose or modified starches has also been proposed. U.S. Pat. Nos. 5,314,754, and 5,316,578 both suggest the use of modified starches including hydroxypropyl substituted starches. Hydroxypropylation reportedly increases elongation at break and burst strength and improved resilience in the polymers. Although the efficacy of these special and modified starches is recognised, their cost inhibits the commercial acceptability of the products made from them.

It is an object of this invention to provide a biodegradable polymer which can be processed and thermoformed into sheet and shaped products without difficulty and have acceptable properties for its intended uses.

BRIEF DESCRIPTIONS OF THE INVENTION

To this end the present invention provides a process for forming biodegradable polymers which includes the steps of a) forming a mixture of starch, a modified starch, a water soluble polymer or copolymer containing vinyl alcohol units, up to 20% of added water or a polyol plasticizer and 0.4 to 1.5% by weight of a $C_{12-22}$ fatty acid or salt, b) working the mixture and forming a melt within the temperature range of 130° C. to 160° C.

c) reducing the temperature and further working the mixture and the extruding the mixture or injecting the mixture into a mould at a temperature of 85° C. to 105° C. without the need to remove water.

The process as defined allows starch based mixtures to be extruded without foaming. The need to vent the extruder to remove water prior to the mix exiting the extrusion die is not needed. Both rigid sheet and flexible starch based films can be made using this process. The foaming temperature of the mix is raised above the temperature at which the melt is most easily plasticised and extruded.

In another aspect, the present invention provides a biodegradable polymer having the composition a) from 8 to 80% by weight of a starch modified to include an hydroxyalkyl $C_{2-6}$ group or modified by reaction with an anhydride of a dicarboxylic acid b) from 0 to 87.9% of starch c) from 4 to 11% by weight of a water soluble polymer selected from polyvinylacetate, polyvinyl alcohol and copolymers of ethylene and vinylalcohol which have a melting point compatible with the molten state of the starch components d) from 0 to 20% by weight of a polyol plasticiser e) from 0.1 to 1.5% by weight of a $C_{12-22}$ fatty acid or salt and f) from 0 to 12% by weight of added water.

The compositions defined include formulations suitable for forming films or thermoforming rigid products such as packaging trays. The defined compositions are easier to process as they can be extruded in film or sheet form without foaming. The extruded sheet can be thermoformed into shaped trays or containers for use as biodegradable packaging. Usually the need to vent the extruder to remove water prior to the mix exiting the extrusion die is not needed with these formulations.

The upper limit to the content of the modified starch is determined by its cost. This component contributes structural benefits to the resulting material. A preferred component is hydroxypropylated amylose. Other substituents can be hydroxyethyl or hydroxybutyl to form hydroxyether substitutions, or anhydrides such as maleic phthalic or octenyl succinic anhydride can be used to produce ester derivatives. The degree of substitution[the average number of hydroxyl groups in a unit that are substituted] is preferably 0.05 to 2. The preferred starch is a high amylose maize starch. A preferred component is a hydroxypropylated high amylose starch A939 marketed by Goodman Fielder. A preferred concentration range to meet cost parameters for biscuit trays is 12 to 24%.

The other starch component is any commercially available starch. This may be derived from wheat, maize, potato, rice, oat, arrowroot, and pea sources.

Generally the water content is about 10 to 15%. A preferred concentration range for starch is 50 to 70.6%

The polymer component c) of the composition is preferably compatible with starch, water soluble, biodegradable and has a low melting point compatible with the processing temperatures for starch. Polyvinyl alcohol is the preferred polymer but polymers of ethylene-vinyl alcohol, ethylene vinyl acetate or blends with polyvinyl alcohol may be used. A preferred concentration range for sheet material is 7 to 9%.

The preferred plasticiser is glycerol although ethylene glycol and diethylene glycol are also suitable as is sorbitol. Cost and food contact are important issues in choosing the appropriate plasticizer. For low humidity environments such as biscuit packages it has been found that lower plasticizer content improves the toughness and long term resilience of the material. This is partly due to the properties of the starch ether component and the fact that at low humidity plasticizers such as glycerol tend to remove water from the starch polymer and make it more brittle. It is possible to process the formulation with no plasticizer and the rigid polymer formed is flexible and has good impact resistance at low humidity. When the plasticiser content is low additional water is added to improve processing. Thus the plasticizer content is preferably 0 to 12% and the water content is 12 to 0%. For film processing the plasticizer content is preferably higher than for rigid sheet products. Higher concentrations of plasticiser improve flexibility and for flexible packaging films or mulch films the preferred plasticiser content is 10 to 16%. The fatty acid or fatty acid salt component is preferably present in concentrations of 0.6 to 1%. Stearic acid is the preferred component. Sodium and potassium salts of stearic acid can also be used. Again cost can be a factor in the choice of this component but lauric, myristic, palmitic, linoleic and behenic acids are all suitable. It is found that the acid tends to accumulate near to the surface of the composition as it is extruded.

DETAILED DESCRIPTION OF THE INVENTION

Processing conditions depend on the formulations and the desired properties of the product to be produced. The materials need to be heated above 140° C. in the extruder to fully gelatinise the starches. The die temperature needs to be controlled below 110° C. to avoid foaming.

The preferred method of carrying out this invention involves mixing the starch, modified starch, vinylalcohol polymer lubricant and fatty acid components into a free flowing powder. The premixing can be carried out in any conventional mixer. The powder is then introduced into a screw extruder and subjected to an elevated temperature by the shearing action of the screw and the application of external heat to the barrel. The temperature is raised to a maximum in the range of 130° C. to 160° C. Any liquid components including additional water are introduced during this initial phase. The melt that is formed is then propelled toward the die and in moving forward the temperature is reduced to a value in the range of 85° C. to 105° C.

A typical extrusion for rigid products has the following parameters:
Temperature profile ° C.: 60, 70, 90, 110, 130, 145, 130, 120, 110
Screw Speed 120 rpm
Die Pressure 1400 psi Flexible film can be formed by simply extruding from a sheet forming die and then increasing the speed of the take-off roller to achieve the reduced thickness needed for flexible film. Cooling of the film between the die and the roller is usually needed to ensure that the film does not adhere to the roller. De-humidified air to cool the film also assists in removing excess moisture from the film surface. If the film is formed by the blown tube method dehumidified air is used to blow the film as it exits the die. Talc may also be entrained in the air stream to reduce blocking of the film.

EXAMPLES 1-14

Biscuit trays were made by extruding a sheet and subsequently thermo forming the tray in a hot press. A twin screw extruder was used with a screw speed of 130 rpm. The barrel temperature profile was 95 [die], 95 [adapter], 95, 95, 95, 95, 100, 130, 140, 150, 140, 110, 90, 60. The process avoided foaming at the die and did not require venting of the barrel to remove moisture.

The formulations and the initial observations of the trays' performance are given in the table 1.

More detailed tests were carried out on sheets made from examples 9 to 14 and these results are shown in tables 2, 3 & 4.

TABLE 1

| Example | A939 [hydroxy propylated amylose] | Wheat Starch | PVOH | Glycerol | Stearic Acid | Remarks |
|---|---|---|---|---|---|---|
| 1 | 37.46 | 37.46 | 8.1 | 14.29 | 0.84 | Includes 4.02% talc no foam, fairly flexible, very strong |
| 2 | 33.51 | 33.51 | 7.46 | 21.05 | 0.75 | Includes 3.72% CaCO$_3$ No foam, flexible, weak |
| 3 | 34.42 | 34.42 | 7.66 | 18.92 | 0.77 | Includes 3.81% CaCO$_3$ slight foam, flexible, strong |
| 4 | 35.38 | 35.38 | 7.88 | 16.67 | 0.79 | Includes 3.92% CaCO$_3$ slight foam, flexible, strong |
| 5 | 37.34 | 37.34 | 7.87 | 16.67 | 0.78 | no foam, flexible, strong |
| 6 | 38.41 | 38.41 | 8.08 | 14.29 | 0.81 | no foam, flexible, strong |
| 7 | 39.71 | 39.71 | 8.03 | 11.76 | 0.79 | no foam, flexible, very strong |
| 8 | 38.03 | 38.03 | 7.69 | 11.27 | 0.76 | Includes 4.23% water no foam, flexible, fairly strong |
| 9 | 81 | 0 | 8 | 10.2 | 0.8 | |
| 10 | 65 | 16 | 8 | 10.2 | 0.8 | |
| 11 | 57 | 24 | 8 | 10.2 | 0.8 | |
| 12 | 24 | 57 | 8 | 10.2 | 0.8 | |
| 13 | 16 | 65 | 8 | 10.2 | 0.8 | |
| 14 | 0 | 81 | 8 | 10.2 | 0.8 | |

TABLE 2

| | Youngs Modulus | | |
|---|---|---|---|
| example | initial | 24 hours | 1 week |
| 9 | 942.591 | 355.992 | 395.783 |
| 10 | 743.174 | 611.025 | 459.516 |
| 11 | 729.490 | 578.648 | 567.977 |
| 12 | 905.406 | 609.926 | 600.324 |
| 13 | 1079.915 | 519.888 | 688.400 |
| 14 | 1155.357 | 797.400 | 749.335 |

TABLE 3

Stress at 0.2% yield offset

| C | initial | 24 hours | 1 week |
|---|---------|----------|--------|
| 9 | 9.522 | 2.189 | 3.413 |
| 10 | 6.016 | 4.144 | 3.078 |
| 11 | 7.313 | 3.823 | 4.102 |
| 12 | 7.929 | 3.814 | 5.695 |
| 13 | 12.624 | 5.178 | 6.263 |
| 14 | 14.175 | 6.884 | 6.565 |

TABLE 4

% strain at the breaking point

| C | initial | 24 hours | 1 week |
|---|---------|----------|--------|
| 9 | 56.969 | 82.532 | 78.304 |
| 10 | 49.845 | 43.613 | 41.588 |
| 11 | 56.550 | 56.166 | 37.591 |
| 12 | 19.188 | 47.033 | 21.798 |
| 13 | 17.699 | 40.952 | 21.165 |
| 14 | 8.552 | 27.661 | 16.145 |

From the above tests and examples and based on cost considerations a suitable formulation for this biscuit tray application is:

| A939 [hydroxy propylated amylose] | Wheat Starch | PVOH | Glycerol | Stearic Acid |
|---|---|---|---|---|
| 15 | 65.2 | 8 | 11 | 0.8 |

The trays are biodegradable and have strength and flexibility properties comparable to the non biodegradable materials currently used. The costs of production are also comparable.

EXAMPLES 15-22

The effect of stearic acid content on the composition was tested using a formulation of:

| Wheat starch | 36% |
|---|---|
| Modified Amylose A939 | 36% |
| Polyvinyl alcohol | 8% |
| Glycerol | 10% |
| Water | 10% |

The mixture was processed at a feed rate of 1.5 a screw speed of 100 rpm and the temperature profile was 70, 90, 100, 130, 140, 140, 130, 115, 110, 110, 110 [die]

| Example | Stearic acid content [%] | Torque [%] | Mass [g/min] | Quality of Sheet [observation] |
|---|---|---|---|---|
| 15 | 0.0 | 57 | 101 | Rough surface |
| 16 | 0.4 | 51 | 100 | Nice sheet |
| 17 | 0.8 | 44 | 106 | Nice sheet |
| 18 | 1.2 | 39 | 114 | Nice sheet |
| 19 | 2 | 38 | 106 | Sheet with some holes |
| 20 | 3 | 38 | 106 | Sheet with holes |
| 21 | 4 | 35 | 101 | Sheet with a lot of holes |
| 22 | 5 | 34 | 102 | Sheet with a lot of holes |

The results show that torque is decreased with increase in stearic acid content. Output mass peaks at a stearic acid content of 1.2 g. the preferred range of stearic acid is 0.4 to 1.5%.

EXAMPLES 23-26

The following four formulations have also been found suitable for use in forming packaging trays for foodstuffs such as chocolates and biscuits.

| Materials | Example 23 | Example 24 | Example 25 | Example 26 |
|---|---|---|---|---|
| A939 | 39.5 | 39.5 | 79 | 79 |
| Wheat starch | 39.5 | 39.5 | 0 | 0 |
| PVOH | 8 | 8 | 8 | 8 |
| Stearic acid | 1 | 1 | 1 | 1 |
| Glycerol | 6 | 3 | 6 | 3 |
| Water | 8 | 10 | 8 | 10 |

EXAMPLE 27

Formulations as shown in table 5 were prepared for the purpose of assessing their performance under low and high humidity conditions and to assess the performance of the plasticiser under these conditions.

TABLE 5

| Materials | A939 % | PVOH % | Stearic acid % | Water % | Glycerol % |
|---|---|---|---|---|---|
| A | 79.5 | 7.95 | 0.8 | 0 | 11.75 |
| B | 78.31 | 7.84 | 0.8 | 4.35 | 8.7 |
| C | 78.31 | 7.84 | 0.8 | 7.25 | 5.8 |
| D | 78.31 | 7.84 | 0.8 | 10.15 | 2.9 |
| E | 79.5 | 7.95 | 0.8 | 11.75 | 0 |

Table 6 shows the strength characteristics at 65% RH and table 7 shows the characteristics at 15% RH for these formulations.

TABLE 6

65% RH

| Formulation | Modulus [Mpa] | Yield S. [Mpa] | Elongation % |
|---|---|---|---|
| A | 547 | 3.2 | 118 |
| B | 774 | 7.1 | 78 |
| C | 1080 | 14 | 65 |
| D | 1556 | 18 | 40 |
| E | 1832 | 27 | 28 |

TABLE 7

| | 15% RH | | |
|---|---|---|---|
| Formulation | Modulus [Mpa] | Yield S. [Mpa] | Elongation % |
| A | 1750 | 27 | 20 |
| B | 1916 | 33 | 26 |
| C | 2035 | 33 | 23 |
| D | 2447 | 38 | 24 |
| E | 2696 | 41 | 23 |

Tables 6 and 7 show that under high or medium relative humidity Glycerol improves toughness as measured by elongation. Under low relative humidity the glycerol absorbs water from the starch in the polymer and this decreases toughness.

EXAMPLE 28

Two formulations were prepared on being formula E of example 27 and the other being the same except that 50% of the A939 was replaced by wheat starch. Both formulas were processed extruded as sheet and then thermoformed into biscuit trays. The trays were used in a product trial where biscuits were placed in the tray packaged and then stored for three months. The performance and appearance of the trays were acceptable and as good as conventional non-biodegradable trays. The significant advantage of the trays made by both formulations were that disposal was much simpler. Conventional trays are difficult for consumers to compress and their volume cannot be significantly reduced but by simply running these trays under a tap they can be compressed by hand into a small disposable pellet.

From the above description and examples it can be seen that the present invention provides a biodegradable starch polymer that is comparable in price and performance characteristics to conventional non-biodegradable polymers. Consequently packaging of products such as biscuits and chocolates using a rigid thermoformed tray can be just as presentable and attractive with the added benefit of being environmentally friendly. Similarly packaging of products such as bread, in flexible packaging films, can also be attractive and biodegradable.

The invention claimed is:

1. A biodegradable polymer consisting essentially of the following in percent by weight:
   a) 8 to 80% of a high amylose starch modified to include a hydroxyalkyl $C_{2-6}$ group or modified by reaction with an anhydride of a carboxylic acid,
   b) 4 to 11% of a water soluble polymer selected from polyvinylacetate, polyvinyl alcohol or a mixture thereof,
   c) 0 to 12% added water,
   d) 0 to 12% of a polyol plasticizer,
   e) 0.1 to 1.5% of a $C_{12-22}$ fatty acid or a $C_{12-22}$ fatty acid salt,
   f) the balance being an unmodified natural starch.

2. A biodegradable polymer as claimed in claim 1 wherein component e) comprises stearic acid or a salt thereof.

3. A biodegradable polymer as claimed in claim 1 wherein the polyol plasticizer comprises glycerol.

4. A biodegradable polymer as claimed in claim 1 wherein the polyol plasticizer content is zero and added water is from 10 to 12%.

5. A biodegradable polymer suitable for use in thermoforming rigid packaging products, said polymer consisting essentially of the following in percent by weight: a) 8-80% high amylose starch modified to include a hydroxyalkyl $C_{2-6}$ group or modified by reaction with an anhydride of a carboxylic acid; b) 4-11% of a water soluble polymer comprising polyvinylacetate, polyvinyl alcohol or a mixture thereof; c) up to 12% added water; d) 0.4 to 1.2% of a $C_{12-22}$ fatty acid or a $C_{12-22}$ fatty acid salt.

6. A biodegradable polymer that has been adapted to form a film, said polymer composition consisting essentially of, in percent by weight:
   a) 8 to 80% of a high amylose starch modified to include a hydroxyalkyl $C_{2-6}$ group or modified by reaction with an anhydride of a carboxylic acid
   b) 4 to 11% of a water soluble polymer selected from polyvinyl acetate, polyvinyl alcohol and copolymers of ethylene and vinyl alcohol
   c) 10 to 16% of a polyol plasticizer
   d) up to 12% added water
   e) 0.1 to 1.5% of a $C_{12-22}$ fatty acid or $C_{12-22}$ fatty acid salt
   f) the balance being an unmodified natural starch.

7. A biodegradable polymer as claimed in claim 6 wherein component e) comprises stearic acid.

8. A composition as claimed in claim 6 wherein component b) comprises a polyvinyl alcohol.

* * * * *